May 11, 1926.

T. W. MILLER

COVERING

Filed Sept. 22, 1924

1,584,694

Thomas W. Miller
Inventor
by Smith and Freeman
Attorneys

Patented May 11, 1926.

1,584,694

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

COVERING.

Application filed September 22, 1924. Serial No. 739,028.

My invention relates to coverings and the particular object of my invention is to provide a covering superior to anything heretofore in use. In the drawings accompanying this specification and forming a part thereof I have shown, for purposes of illustration, two embodiments which my invention may assume. In these drawings:

Figure 3 is a plan view of the second embodiment of my invention, while

Figure 1:
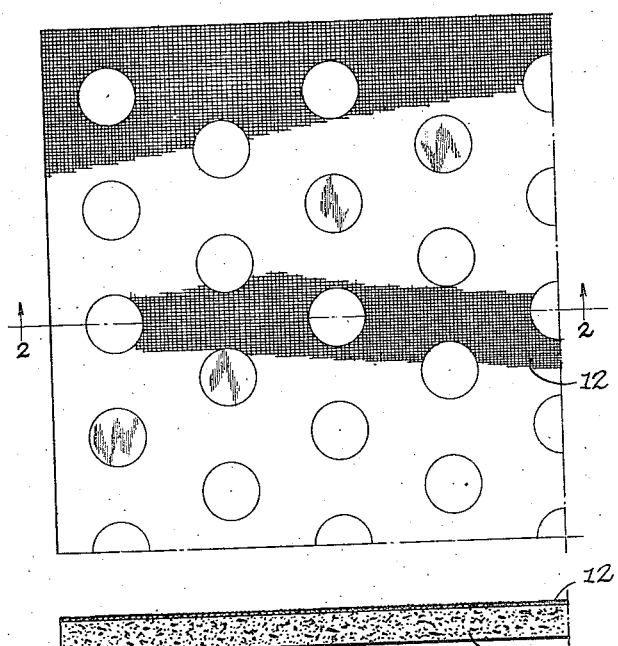
Figure 1 is a plan view of one of these embodiments of my invention.
Figure 2:
Figure 2 is a section on the line 2—2 of Figure 1.

The embodiment of my invention disclosed in Figures 1 and 2 comprises a relatively thick sponge rubber base portion 11 surmounted by a relatively thin solid rubber face portion 12 integral with the base portion 11 and embossed to present an attractive appearance. This embodiment of my invention is particularly designed for use as a floor covering and may either be formed in long lengths and used in a manner similar to that in which rubber matting and linoleum are used at the present time or be formed in blocks and used as tiling.

Figure 3:
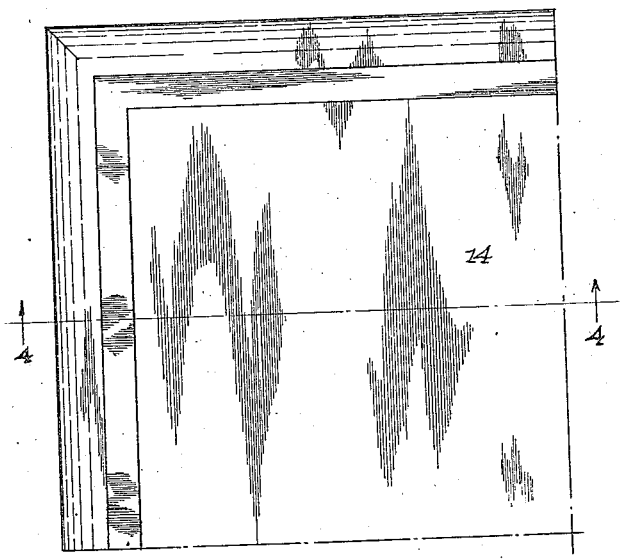
Figure 4:
Figure 4 is a section on the line 4—4 of Figure 3.

The embodiment of my invention disclosed in Figures 3 and 4 comprises a relatively thick sponge rubber base portion 13 surmounted by a relatively thin solid rubber face portion 14 integral with the base portion 13 and appearing in a plurality of colors to present a more attractive appearance. This embodiment of my invention is particularly designed as a substitute for the noisy metal table tops so widely used in restaurants and accordingly in this embodiment of my invention the covering is formed in a single piece the size of the table top cover, the edges are preferably beveled as herein shown, and the solid rubber surface 14 is extended to cover the edges of the covering as well as the top surface thereof.

It will be obvious that both forms of covering herein shown are soft and yielding yet provided with a tough, long-wearing, and easily cleaned surface, and are therefore superior to any covering of the type heretofore known or used. It will also be apparent that the embodiment of my invention shown in Figures 1 and 2 may also be ornamented in various colors either with or without embossing and may also be used as a covering for tables, that the embodiment of my invention shown in Figures 3 and 4 may be embossed either wtih or without ornamentation and may be used as a covering for floors, particularly as a mat, that either embodiment of my invention may be secured in position by cementing to the surface or in any other suitable manner, and that in either embodiment of my invention all embossing and coloring may be omitted, the face material may be other than pure rubber and particularly a mixture of rubber and other materials, the covering may be reinforced in any desired manner as by a fabric sheet placed upon the back of the covering or elsewhere, and both faces of the covering may be surfaced if desired. It will be obvious to those skilled in the art that the particular embodiments of my invention herein shown and described may be variously changed and modified without departing from the scope of my invention or sacrificing the advantages thereof and that my invention may be carried out in various embodiments other than those herein shown or suggested. It will therefore be understood that this disclosure is illustrative only and that my invention is not limited thereto.

I claim:

A covering formed to size and comprising an essentially flat relatively thick sponge rubber base portion surmounted by a flat relatively thin facing sheet integrated with said base portion, formed at least partly of rubber, and extending over both the top and edges of said base portion.

In testimony whereof, I hereunto affix my signature.

THOMAS W. MILLER.